US010127521B2

(12) United States Patent
Göllü

(10) Patent No.: US 10,127,521 B2
(45) Date of Patent: Nov. 13, 2018

(54) SYSTEM AND METHOD FOR DETERMINING AND CONTROLLING STATUS AND LOCATION OF AN OBJECT

(71) Applicant: PINC Solutions, Alameda, CA (US)

(72) Inventor: Aleks Göllü, El Cerrito, CA (US)

(73) Assignee: PINC Solutions, Alameda, CA (US)

( * ) Notice: Subject to any disclaimer, the term of this patent is extended or adjusted under 35 U.S.C. 154(b) by 0 days.

(21) Appl. No.: 15/457,592

(22) Filed: Mar. 13, 2017

(65) Prior Publication Data
US 2017/0185956 A1 Jun. 29, 2017

Related U.S. Application Data

(63) Continuation of application No. 14/807,660, filed on Jul. 23, 2015, now Pat. No. 9,592,964.

(51) Int. Cl.
G06F 7/00 (2006.01)
G06Q 10/08 (2012.01)
G06K 7/14 (2006.01)
G06K 7/10 (2006.01)

(52) U.S. Cl.
CPC ....... *G06Q 10/087* (2013.01); *G06K 7/10366* (2013.01); *G06K 7/1413* (2013.01); *G06K 7/1417* (2013.01)

(58) Field of Classification Search
None
See application file for complete search history.

(56) References Cited

U.S. PATENT DOCUMENTS

| 7,236,091 | B2 | 6/2007 | Kiang et al. |
| 7,245,215 | B2 | 7/2007 | Göllü et al. |
| 7,321,305 | B2 | 1/2008 | Göllü et al. |
| 7,786,844 | B2 | 8/2010 | Ehrman et al. |
| 2007/0294692 | A1 | 12/2007 | Zhao et al. |
| 2008/0077511 | A1 | 3/2008 | Zimmerman |
| 2014/0074342 | A1 | 3/2014 | Wong et al. |

(Continued)

OTHER PUBLICATIONS

"EPCglobal Specification for RFID Air Interface", http://www.gsl.org/sites/default/files/docs/epc/uhfc1g2_1_0_9-standard-20050126.pdf; Jan. 31, 2005.

(Continued)

*Primary Examiner* — Yolanda R Cumbess
(74) *Attorney, Agent, or Firm* — Michael A. Glenn; Perkins Coie LLP

(57) ABSTRACT

Techniques are described with regard to determining and controlling a location and status of assets directly and/or indirectly. The techniques may be used to track and control the respective locations and status of any number of objects. Applications include but are not limited to tracking dry and refrigerated trailers and their status in a supply-chain yard; tracking pallets and boxes and their status in a warehouse; tracking items in a retail environment; tracking finished goods and work in progress in and around a manufacturing plant; tracking vehicles in a parking lot; tracking cargo and equipment at an airport; tracking equipment in a lay down yard; etc. In all cases the laborious and error prone data gathering is replaced with automated data collection methods reducing cost, increasing accuracy, and increasing efficiency.

13 Claims, 8 Drawing Sheets

(56) References Cited

U.S. PATENT DOCUMENTS

2014/0247116 A1* 9/2014 Davidson ............ G06Q 10/087
                                                340/10.1
2014/0267703 A1   9/2014 Taylor et al.
2014/0365258 A1* 12/2014 Vestal ............ G06Q 10/063114
                                                705/7.15

OTHER PUBLICATIONS

"Wireless Networks", Power and Productivity for a better world ABB; www.linear.com/products/wireless_sensor_networks_-_dust_networks; retrieved from the internet Oct. 19, 2016; Milpitas, CA.
"Wirelss Sensor Networks ABB", http://new.abb.com/network-management/communication-networks/wireless-networks; retrieved from the internet Oct. 19, 2016.

* cited by examiner

SYSTEM AND METHOD FOR DETERMINING AND CONTROLLING STATUS AND LOCATION OF AN OBJECT

CROSS REFERENCE TO RELATED APPLICATIONS

This patent application is a continuation of U.S. patent application Ser. No. 14/807,660, titled "SYSTEM AND METHOD FOR DETERMINING AND CONTROLLING STATUS AND LOCATION OF AN OBJECT", filed Jul. 23, 2015, the entirety of which is incorporated herein by this reference thereto.

BACKGROUND OF THE INVENTION

Technical Field

This invention relates generally to the field of automated data collection. More specifically, this innovation relates to determining and controlling a location and status of an asset, directly or indirectly.

Description of the Related Art

Position-tracking systems seek to identify the location of mobile objects in real-time and are used in a wide variety of applications, including transportation, logistics management, healthcare, security, etc. Position-tracking systems that can provide continuous location information are desirable for applications that require non-interrupted visibility of the mobile object through a journey.

U.S. Pat. No. 7,321,305 discusses a system and method for determining the location of an object. The system includes an object location tracker and a corresponding computer system. The object location tracker is configured for attachment to a mobile vehicle and includes an object identification reading device and a position-tracking device. The object identification reading device senses object identification indicia on the object, such as radio frequency identification (RFID) tags, bar codes, quick response (QR) codes, etc. as the mobile vehicle moves around an environment in which the object is situated. The position-tracking device computes the location of the location tracker as the mobile vehicle moves throughout environment. The computer system associates the sensed object identification indicia of the object, as determined by the reading device, with a location in the environment based on the position of the object location tracker in the environment, as determined by the position tracking device, when the reading device senses the object identification indicia. The mobile vehicle may include its own mobility system, such as for example, a forklift or an autonomous robotic device, a drone, or the mobile vehicle may be, for example, a pushcart that is pushed around the environment. The technique uses an active object location tracker on a mobile vehicle, which then is used to locate a multitude of other assets that carry passive indicia.

The advent of a multitude of intelligent autonomous mobile vehicles, and the proliferation of low cost active indicia, sensors, and actuators that can carry status information in addition to identification information have paved the path to observe and control the status of the tracked assets, in addition to their locations. Subsequently, the status of the assets can be used to guide the further actions of the mobile vehicle carrying the location tracker and the computer system.

SUMMARY OF THE INVENTION

Techniques are described with regard to determining and controlling a location and status of assets directly and/or indirectly. The techniques may be used to track and control the respective locations and status of any number of objects. Applications include but are not limited to tracking dry and refrigerated trailers and their status in a supply-chain yard; tracking pallets and boxes and their status in a warehouse; tracking items in a retail environment; tracking finished goods and work in progress in and around a manufacturing plant; tracking vehicles in a parking lot; tracking cargo and equipment at an airport; tracking equipment in a lay down yard; etc. The laborious and error prone data gathering is replaced with automated data collection methods reducing cost, increasing accuracy, and increasing efficiency.

DETAILED DESCRIPTION

The innovation can be understood in the context of the figures which use the following terminology and numbering scheme across the figures to describe an embodiment consisting of multiple Components (hence the notation C). Components of the proposed scheme carry the same id across the figures.

C 1. Facility
C 2. Asset
   C 2.1. Installed On Asset Equipment (IoE)
      C 2.1.1. Equipment details described below
C 3. Vehicle
   C 3.1. Installed On Vehicle Equipment (IoV)
      C 3.1.1. Equipment details described below
C 4. Communication Medium
C 5. Central Control
C 6. Vehicle Trajectory
C 7. Interaction between IoE and IoV
C 8. Direct or indirect (via communication medium) interaction between IoV equipment and Central Control
C 9. Other IT Systems
C 10. Central Control Human Interface
C 11. Other IT Systems Human Interface
C 12. Human Operators FIG. 1 is a schematic diagram that shows high level components of an embodiment: in a facility (C 1) one or more mobile vehicles (C 3) equipped with installed on vehicle ("IoV") equipment (C 3.1) move around along various trajectories (C 6) to track the location and status of various assets (C 2) equipped with installed on asset ("IoA") equipment (C 2.1), where IoV communicates with the central control (C 5) either directly via (C 8.X with direct Internet access) or indirectly via (C 8.1 a local network) through communication medium (C 4 in the facility) and then (C 8.2 a direct Internet connection).

Figure 1:
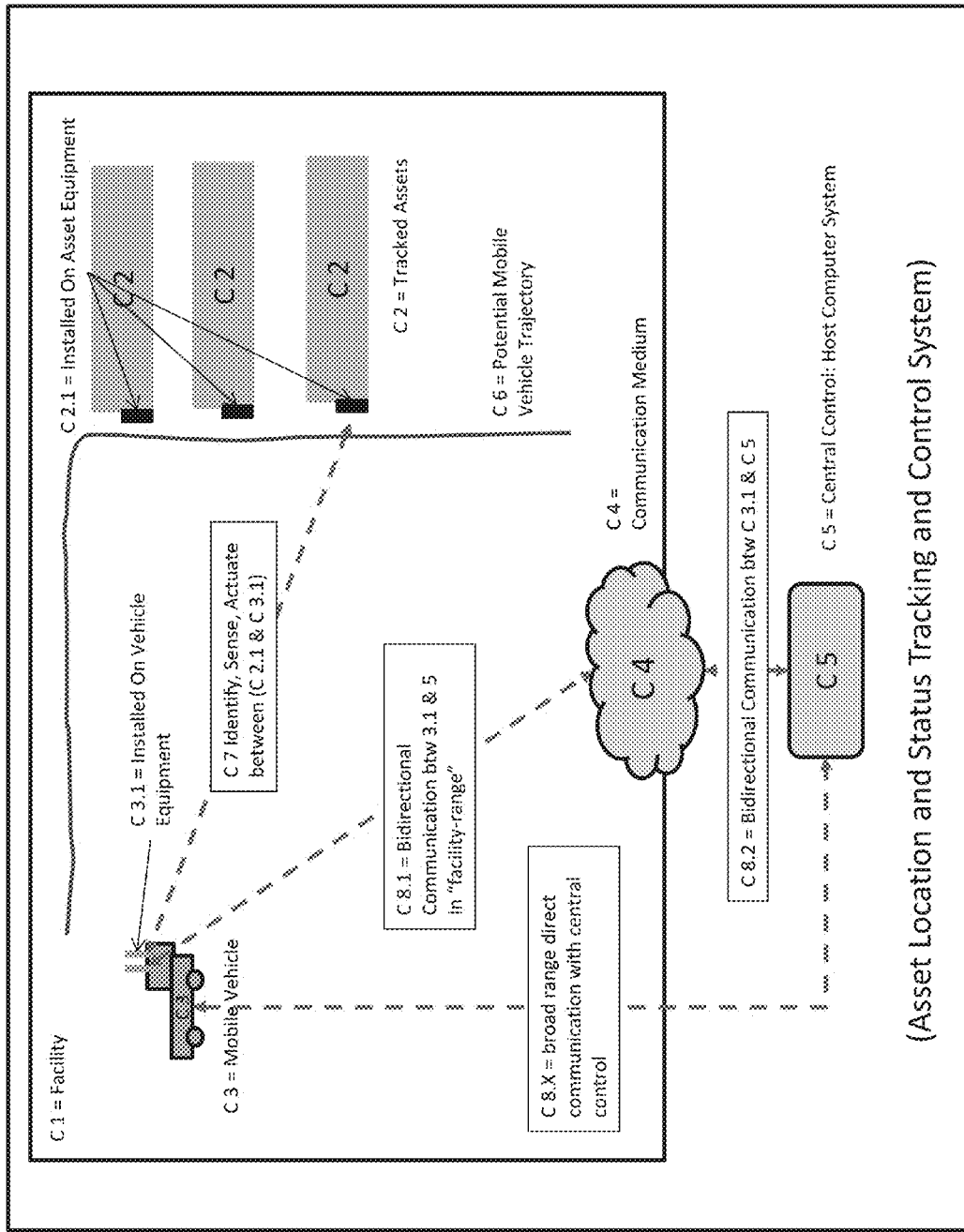
FIG. 1 is a schematic diagram that shows high level components of the system and method, according to an embodiment.

Facility (C 1), in FIG. 1, can be any one of but not limited to a distribution center, manufacturing plant, warehouse, retail store, lay down yard, construction site, farm, or airport.

These facilities contain assets (C 2) whose location need to be tracked such as but not limited to trailers, pallets, equipment, and cargo. Additional information about their status can be collected, such information including but not limited to temperature of a refrigeration unit, fuel/power level of any powered device, maintenance needs of any equipment, condition of any product, etc. Such assets may or may not have the ability to communicate this status. In the case that an asset can communicate its status, such communication may have limited range or may require tethering to the asset.

Such facilities contain mobile vehicles (C 3) that can move about the facility a) as part of the regular operation; b) with the specific intent of moving the assets; or c) with the specific intent of gathering location and status information. These vehicles can be any one of but not limited to a yard truck, a forklift, a push cart, a drone, a tractor, a boat, or even a person on foot.

A central control system (C 5) is an IT system that
collects information coming from the facility;
implements business rules;
presents the information to human operators (C 12);
interacts with other it systems (C 9); and
based on input from human operators, other IT systems, and its implemented business rules sends back commands to the assets in the facility.

For assets in the facility to be able to communicate with central control the technique needs a communication mechanism. The communication mechanism provides coverage, such that assets are either wired to the channel or are wirelessly in-range of communication.

Here one can categorize wireless communication channel range into three levels. "Broad-range" communication, such as that implemented by cellular carriers or satellite providers, essentially allows one to connect to Internet anywhere inside or outside the facility (assuming coverage). Direct connectivity to Internet allows connectivity to central control. The IoV equipment may use such communication (C 8.X) to communicate with central control.

Broad range communication typically carries a service fee to third parties and requires significant power consumption (e.g. cell phone batteries are drained within hours if connected to Internet via cellular networks) as the communication range is to an antenna miles away. The IoV equipment may leverage the vehicle battery as power supply, however, for passive assets the IoA cannot rely on a battery for extended periods of time.

"Facility-range" communication can be implemented by installing a system such as WiMax or multiple WiFi access points. In this case the coverage is available in almost all of the facility, and one can leverage such wireless coverage (C 8.1) to connect to the communication medium of the facility which may then use for example a wired DSL a Cable connection (C 8.2) to connect to the Internet.

This scheme can reduce the third party costs as cellular or satellite connectivity is more expensive than a DSL or Cable connection. Conversely one has to maintain its own WiMax or WiFi system. However, even in this system power consumption can be an issue. It is commonly known that most WiFi connected devices deplete their power within hours. One still has to transmit a signal that has to travel 10-100 meters. The IoV equipment may use this scheme to connect to central control, as the battery in the vehicle can power the equipment.

"Local-range" communication is meant for immediate vicinity of up to about 10 meters. Here as the transmission range is reduced the power consumption for communication is reduced as well. While such communication is ideal for devices that do not have their own power source or ample battery power, it can provide a challenge in providing coverage for all devices in the facility. This challenge can be overcome in three ways:

1. Plastering or covering a facility with communication equipment (i.e. placing communication equipment within a facility), e.g. every 10 meters to create full coverage.
2. Implementing a complex mesh network so that communication to (C 4) can be achieved via other IoA equipment.
3. Moving to the vicinity of the IoA equipment with a vehicle (C 3) that is moving about in the facility.

An important goal is to communicate with a central control system (C 5) for proper operation of the facility with exact knowledge of the location and status of the assets in the facility. It is assumed that in the facility there is a communication medium (C 4) which can act as a gateway between facility (C 1) and its contents, e.g. assets and mobile vehicles, on one end and central control (C 5) on the other end. Such communication is assumed to provide coverage in the facility (facility range as defined above). The IoV equipment can leverage the facility range coverage (C 8.1) via (C 4) and (C 8.2) to central control, or it can use broad coverage (C 8.X) to connect to Internet directly.

Figure 5:
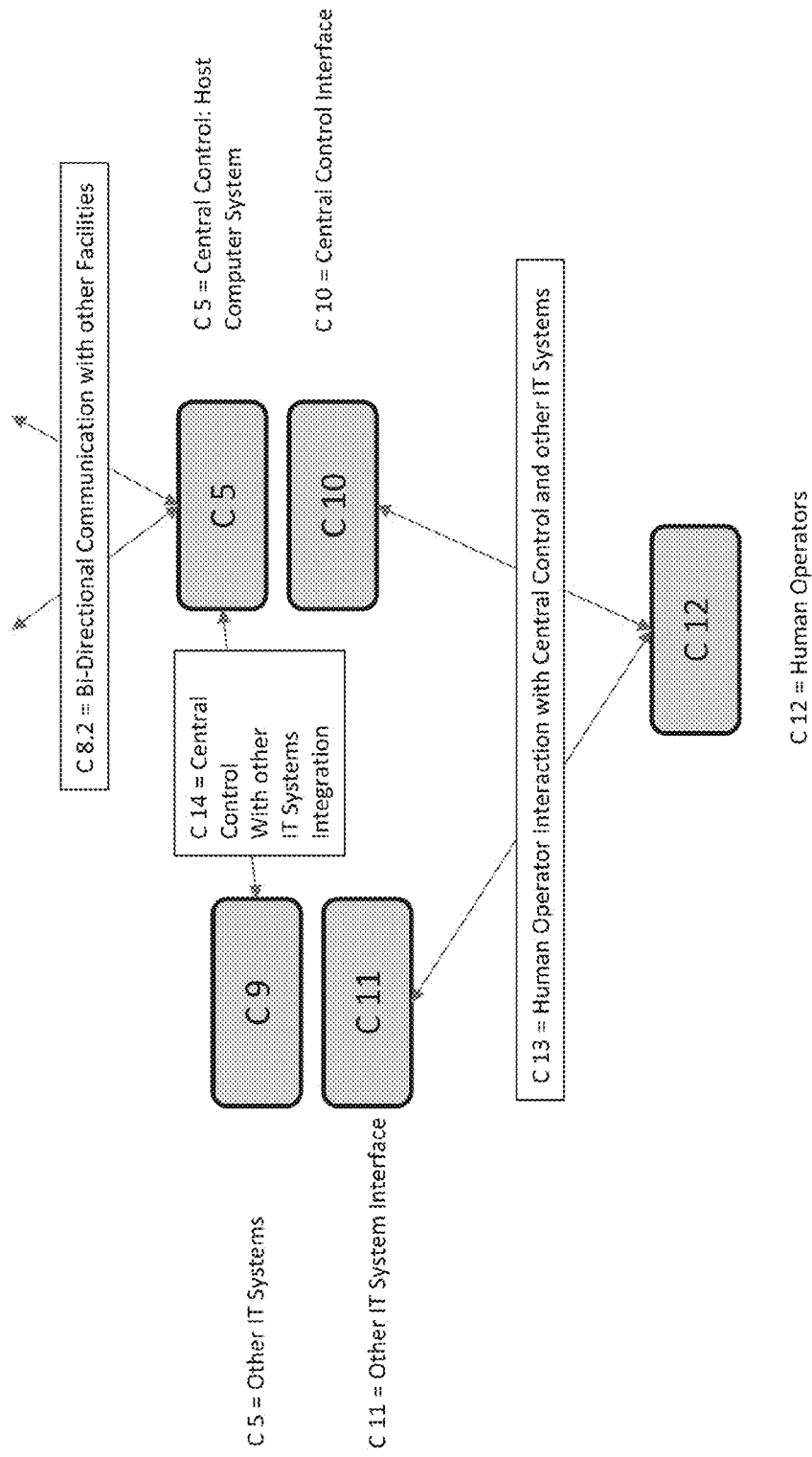
FIG. 5 is a schematic diagram that shows some details concerning the central control entity and a plurality of facilities, according to an embodiment.

Central control (C 5) is responsible for collecting the relevant data; analyzing and processing the collected data; interacting with other information technology ("IT") systems (FIG. 5, C 9); interacting with human operators (FIG. 5, C 12); creating actionable instructions; and communicating the actionable instructions back to mobile vehicle (C 3) and assets (C 2). Examples of such instructions are provided below.

Both assets (C 2) and mobile vehicle (C 3) have specialized equipment installed on them, installed on asset equipment ("IoA" C 2.1) and installed on vehicle equipment ("IoV" C 3.1), respectively.

Figure 2:
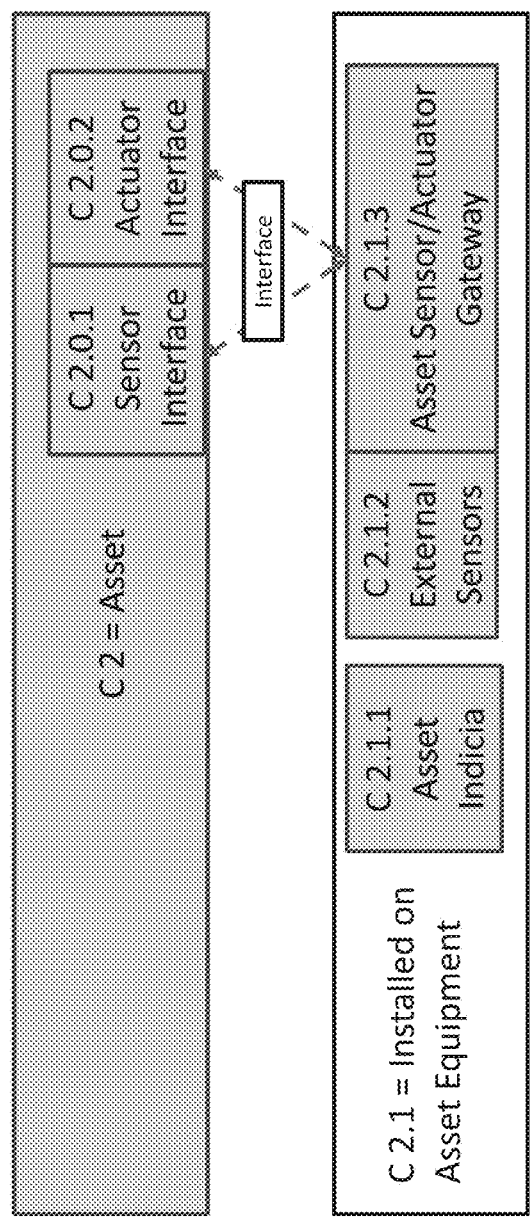
FIG. 2 is a schematic diagram that shows some details of the installed on asset equipment, according to an embodiment.

An embodiment of IoA (C 2.1) is depicted in greater detail in FIG. 2 and is comprised of any of or any combination of:

C 2.1.1 An asset indicium or indicia such as a barcode, a quick response (QR) code, a radio frequency identification (RFID), and the like;
C 2.1.2 A set of external sensors that can sense and transmit the status of the asset; and
C 2.1.3 A sensor/actuator gateway that can interact with the native sensors and actuators on the asset and also bi-directionally communicate with the IoV equipment.

An asset may or may not come pre-equipped with one or more built in sensors having interfaces (C 2.0.1) and one or more actuators having interfaces (C 2.0.2).

Figure 3:
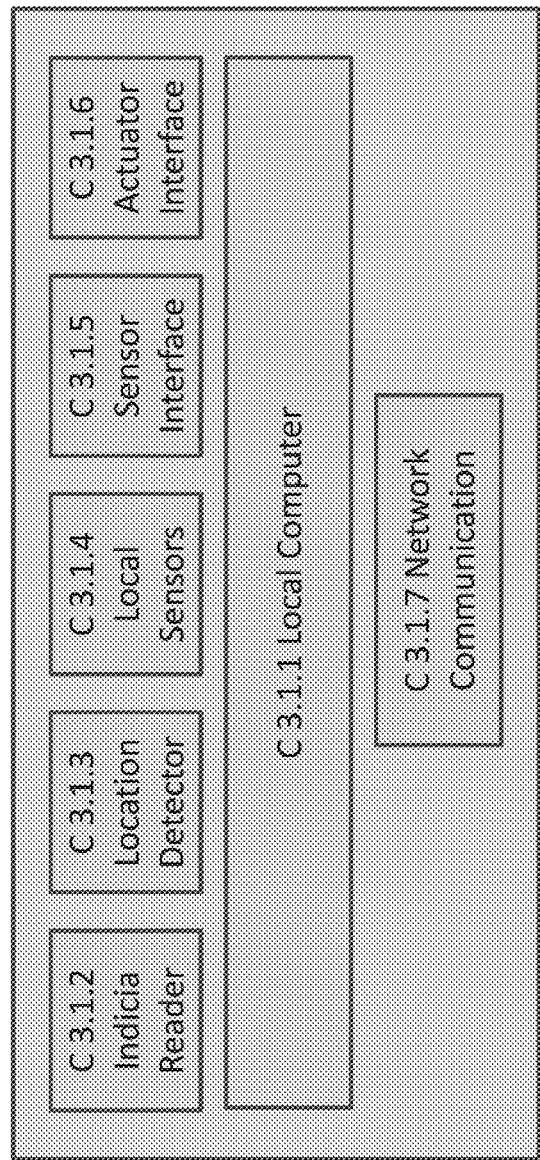
FIG. 3 is a schematic diagram that shows some details of the installed on vehicle equipment, according to an embodiment.

An embodiment of IoV (C 3.1) is depicted in greater detail in FIG. 3 and is comprised of:

C 3.1.1 A local computer that is in communication with the entities listed below and that performs various functionality, described in greater detail below;

C 3.1.2 An indicia reader system which may be a camera, an RFID reader and antenna, or any other system;

C 3.1.3 A location detector which is used to determine a precise location of the vehicle. For example, location detector 3.1.3 may be GPS, differential GPS, GPS augmented with inertial measurement units, or a camera that recognizes markers in the environment;

C 3.1.4 A set of sensors used to sense the environment such as object presence, temperature, and the like;

C 3.1.5 A set of sensors for receiving information from IoA equipment;

C 3.1.6 A set of actuators for transmitting information to the IoA equipment; and C 3.1.7 A communication system to communicate with communication medium (C 4).

It is important to highlight that in different embodiments the IoA equipment may consist of an indicium, it may consist of multiple indicia, and it may have indicia and one or more sensors or actuators. With the approach of this herein described technique, IoA equipment (C 2.1) is not required to have broad or facility range communication capabilities and may be limited to local (short) range communication, thus keeping the IoA costs down, ensuring long battery life, and minimizing third party communication fees. In one embodiment such short range communication can be implemented without any power source (like an RFID or a BarCode id) and has lower cost (currently, the cost of BarCode is sub-pennies and the cost of RFID is pennies or 10s of cents). The communication approach provided in embodiments herein obviates the need to plaster the facility with communication equipment or to depend on complex or costly mesh networks. It implements the locationing, tracking, and control actions with lower cost, lower power devices leveraging the third scheme.

In one or more embodiments, mobile vehicle sensors use a plurality of technologies to gather state information. Examples of such technology include but are not limited to:
- RFID;
- ultrasound;
- infrared;
- radar;
- laser;
- accelerometers, gyroscopes, and inertial measurement units,
- barometers,
- temperature sensors,
- speed and altitude detectors, and
- camera.

Figure 4:
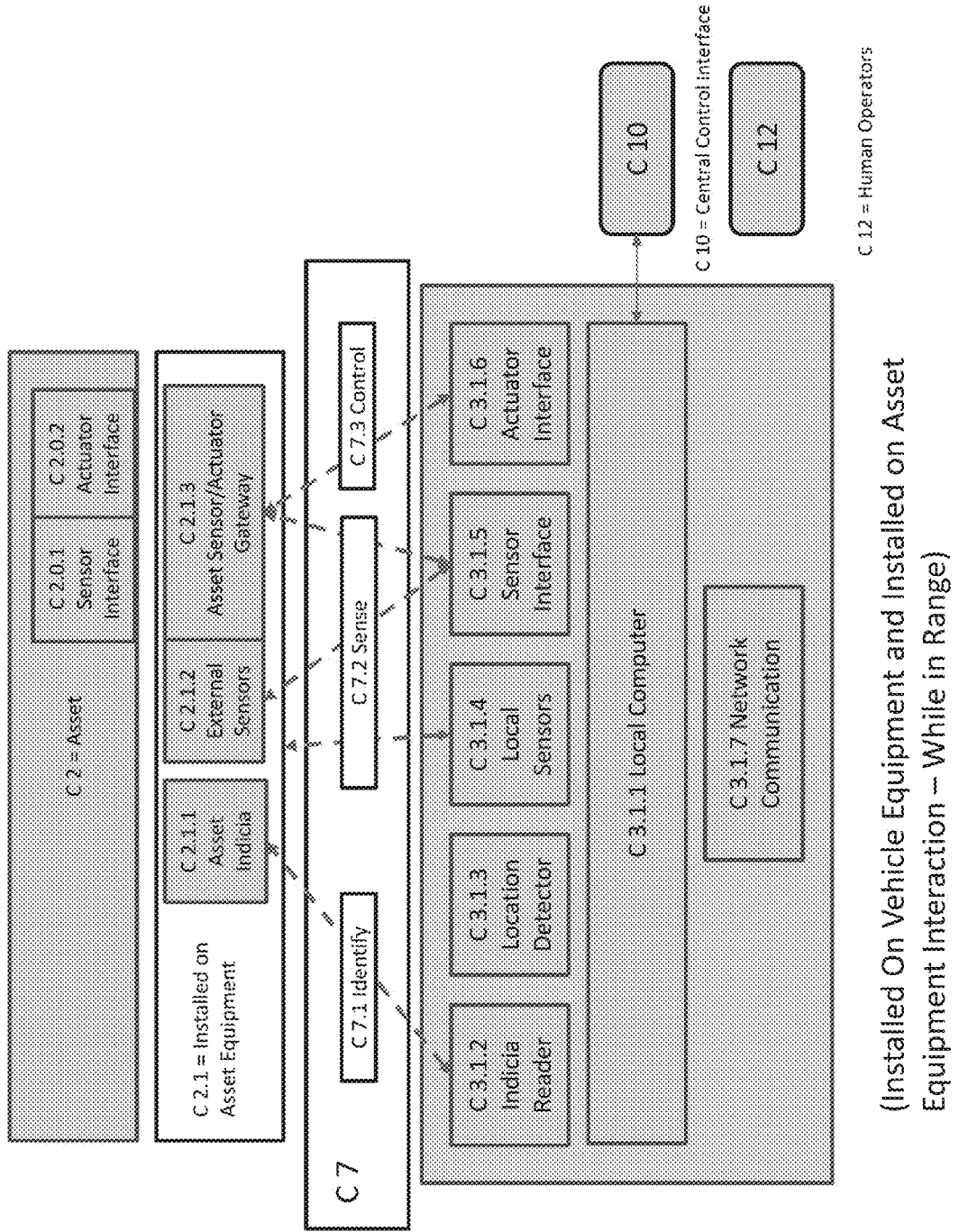
FIG. 4 is a schematic diagram that shows some details the interaction between an IoA and an IoV, according to an embodiment.

An interaction between IoA and IoV can be understood with reference to FIG. 4. Asset indicia reader (C 3.1.2) on the vehicle uses asset indicia (C 2.1.1) on each of the assets to identify the asset, depicted as interaction referred to as identify (C 7.1).

Local sensors (C 3.1.4) on vehicle (C 3) externally sense the status of asset (C 2.1), while sensor interface (C 3.1.5) communicates with sensory equipment, external sensor (C 2.1.2) and asset sensor/actuator gateway (C 2.1.3), on asset (C 2.1). This interaction is depicted as sense (C 7.2).

In one or more embodiments, sensed information are obtained either by external sensors or through interaction with native sensors. Such sensed information can include but are not limited to:
- location;
- age;
- fuel level;
- temperature;
- humidity;
- weight;
- size (width, depth, height);
- service codes; and
- error codes.

Actuator interface (C 3.1.6) on vehicle (C 3) transmits control commands (C 7.3) to actuator gateway on the asset sensor/actuator gateway (C 2.1.3). This interaction is depicted as control.

It is worth noting that the IoV also acts as an interface (C 10) for human operators (C 12) to central control (C 5) to receive instructions or input data to the system.

As stated above the IoA can use direct (broad range) or indirect (facility range) communication to interact with central control. In one embodiment, where such interaction does not have to be real-time such interaction can be implemented via local range communication where connection to (C 4) is available in select and limited spots in the facility. As the mobile vehicle traverses trajectories (C 6) such communication becomes possible on limited segments. In this embodiment, the mobile vehicle interacts with (C 5) while in-range, it transmits collected information and receives future commands; otherwise it is in data-gathering and command transmitting mode.

As stated above, IoA equipment (C 2.1) does not have facility communication range. One indicia reader in the Facility may not have the ability to read all indicia of IoA equipment. Read ranges of 1-10 or even 100 meter make it infeasible to plaster the facility with readers such that any given indicium is in the range of at least one reader. Therefore understanding the movement of vehicle (C 3) can be important because as a vehicle (C 3) follows a trajectory, such as for example trajectory (C 4) depicted in FIG. 1, vehicle (C 3) gets in and out of communication range of such detection and communication. On one hand mobile vehicle (C 3) can be a gateway between asset (C 2) and the rest of the world via central control (C 5) and other IT systems (C 9)—i.e. the IoA and IoV can use local range communication, the IoV then leverages facility or broad communication range to further relay the communication. On the other hand, the points of the trajectory where such communication is possible or is not possible with asset (C 2) are used to locate the asset (C 2).

Figure 6:
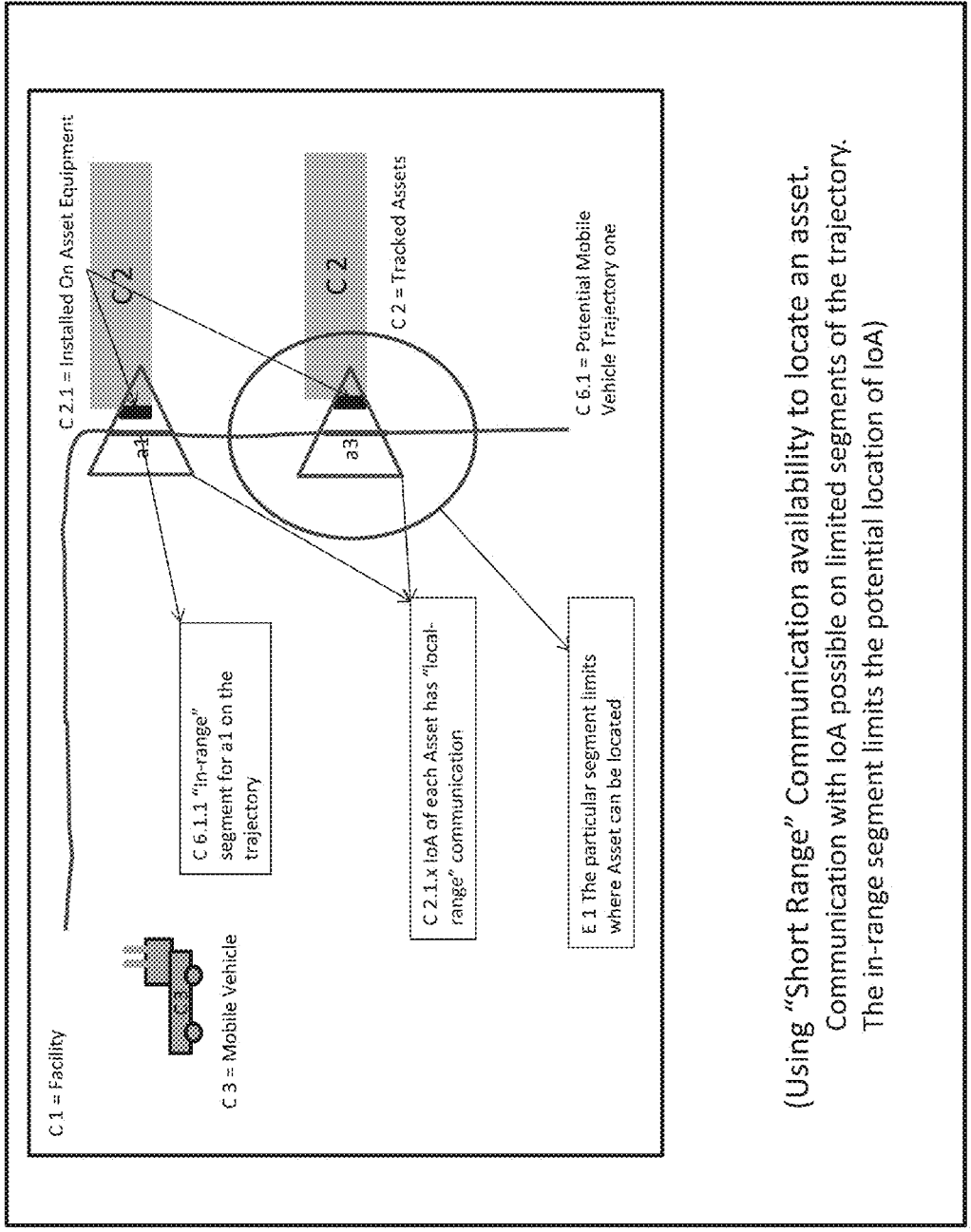
FIG. 6 is a schematic diagram showing segments of a mobile vehicle trajectory where the installed on vehicle equipment is in-range with installed on asset equipment.

This concept is explained further with reference to FIG. 6. The triangles C 2.1.x depict the communication range of the IoA sensors. As a Vehicle moves past, communication is only possible on a limited segment (C 6.1). This segment, combined with the known communication range pattern of the IoV equipment limits the possible locations of said sensor and hence asset to a shape (depicted as ellipse E1) in the facility. The intersections of such ellipses then limit the possible location of an Asset.

Each mobile vehicle (C 3) processes and transmits its collected data to central control (C 5) directly (C 8.x) or indirectly through (C 8.1) via communication medium through (C 8.2) to (C 4). Central control (C 5) then processes such information and transmits back instructions to the mobile vehicles (C 3). Such bi-directional communication interactions are depicted in FIG. 1.

Figure 7:
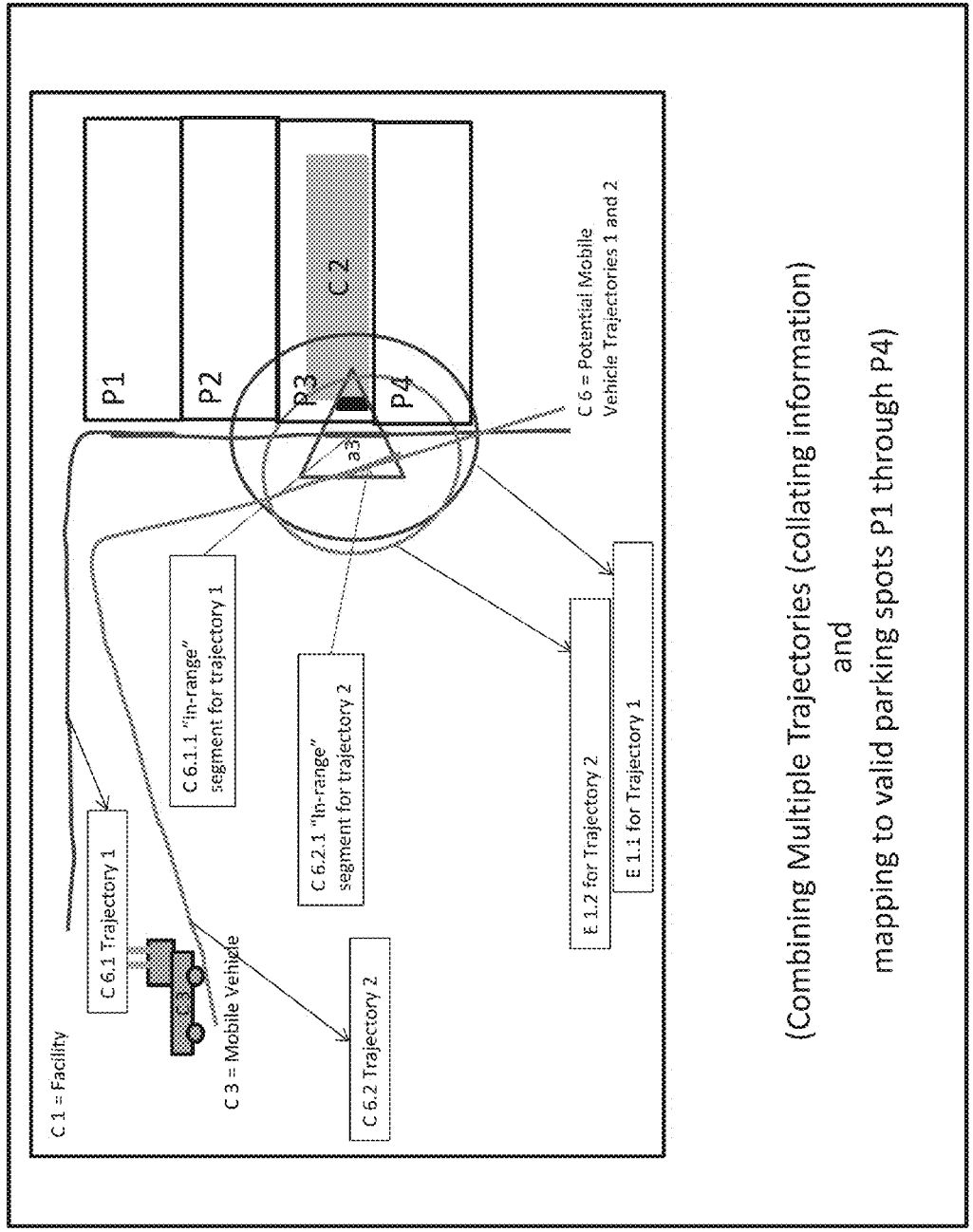
FIG. 7 is a schematic diagram showing how in-range segments of a mobile vehicle trajectory can be used to determine actual asset location.

Central control (C 5) collates information coming from the various mobile vehicles (C 3) and creates a current image of the facility using the collated information. For example as a vehicle moves along a trajectory, as in FIG. 7, it collects information from in-range sensors 10 times a second. Since the IoV equipment includes GPS, the IoV Computer (C 3.1.1) can connect each GPS point on its trajectory with a set of in-range interactions. It has the ability to convert this information to segments of trajectory a given sensor was in-range. It transmits this data stream to Central Control for further processing. Central Control has the ability to post-process either the raw or pre-processed data (raw data including time stamps along with GPS coordinates and in-range sensor data, whereas in one embodiment C 3.1.1 can map these to segments of the trajectory where a given sensor is in rage). Central Control also has the ability to create shapes such as E1 for each segment coming from multiple vehicles. In FIG. 7, two such trajectories and two such possible shapes that correspond to in-range trajectory segments are depicted. One familiar with the art will recognize that in actuality the shapes are much more restrictive as antennas on IoA and IoV are typically directional and have very specific shapes of communication range. The intersection of these shapes then indicates a potential set of locations for the asset. If assets are parked in specific parking spots, this information can be combined with the layout information. In FIG. 7 both P3 and P4 are possible asset locations given the two trajectories; a third trajectory or the presence of other assets may be able to further increase location accuracy. Central control (C 5) collates such points from the various vehicles and creates a time evolved set of points for which each asset is visible. This time-evolved set of points for each asset in turn allows central control (C 5) to determine most likely locations of that asset.

Points of Discussion

Assets (C 2) with installed on asset equipment (C 2.1) are an elegant structure and provide elegant functionality, which yield low cost and do not require broad or facility range communication capability. As a mobile vehicle (C 3) with its installed on vehicle equipment (C 3.1) moves along a trajectory (C 6), such vehicle (C 3) interacts with a plurality of assets (C 2) as each asset (C 2) comes into the proximity of (C 3) in its local range communication area. The information gathered by the mobile vehicle is further transmitted to central control (C 5) for consumption.

Example asset location tracking techniques by leveraging communication range with assets can be found in the following co-assigned patents: U.S. Pat. No. 7,245,215 "Position-Tracking Device for Position Tracking System"; U.S. Pat. No. 7,236,091 "Position-Tracking System"; and U.S. Pat. No. 7,321,305, "Systems and Methods for Determining a Location of an Object," each of which is incorporated herein by reference.

Such asset location tracking techniques can be augmented and enhanced with unique sensing and control capabilities of the assets by the mobile vehicle, as described herein.

As discussed above the gateway created by the mobile vehicle between a plurality of assets having local communication range and the central control system (C 5) can be effected by other known means. For example, many local range communication devices can communicate among themselves and ultimately communicate indirectly in facility-range (i.e. within the reach of the network) and ultimately connect to the communication medium (C 4). However such devices provided for example by Linear Technology (Headquarters, Milpitas, Calif.) or ABB (Wickliffe Ohio) add cost of complexity to assets. Examples of these solutions can be found on the Internet. Examples include Wireless Sensor Networks—Dust Networks on the Linear Technology website or Wireless networks on the ABB website.

In an embodiment, IoA (C 2.1) is passive and does not depend on any local energy source. An example of this is passive RFID Tags, which currently are also referred to as C1G2 RFID Tags. For example, see "Specification for RFID Interface" by EPCglobal Inc. (GS1, Lawrenceville, N.J.). In these solutions the sensors, i.e. the tag implementing the indicium do not have a power source, A reader and antenna originate a waveform, which is absorbed by the antennae on the tag, which wakes up the tag, uses the energy in the wave to respond back and transmit its content, its indicium in this case.

It is worth noting that many a Sensor/Actuator Interface (C 2.0.1 or C 2.0.2) can serve as an asset indicium or an asset sensor/actuator gateway (C 2.1.3) can be configured to act as an asset indicium.

Active devices with long range communication capabilities on the asset can also be used as an alternative for direct communication between IoA equipment (C 2.1) and central control (C 5). However, in this case, power consumption requirements and device cost are higher than implementing the present innovation, and such communication relies on broad communication range as defined above A facility (C 1) can contain a plethora of devices similar to that of IoV equipment (C 3.1), referred to herein as Installed on Facility Equipment (IoF) such that any asset (C 2) and IoA equipment (C 2.1) can be guaranteed to be within the communication range of an IoF. However, in this case, the equipment cost, equipment installation cost, and equipment maintenance cost is significantly higher than implementing the present innovation.

An Exemplary Embodiment

An exemplary embodiment of the innovation is described hereinbelow. It should be appreciated that particular details may be for illustration purposes and, thus, are not meant to be limiting.

In a general aspect, the innovation includes a technique ("system") for determining a location and status of a multitude of assets and controlling their status by leveraging a mobile vehicle. An important aspect of this innovation is that the assets and installed on asset equipment are kept simple and low in cost, without requiring the assets and the installed on asset equipment to have the capability of communication at long range. The mobile vehicle as it moves along a trajectory with its installed on vehicle equipment then interacts with one or more assets as it comes into their proximity. The information gathered by the mobile vehicle then is further transmitted to a central control for consumption.

As depicted in FIG. 1 and FIG. 2 it is assumed that installed on asset equipment (C 2.1) can be comprised of any of or any combination of:
- (C 2.1.1) passive identification indicia (e.g. RFID, Bar Code, QR Code, etc.); and/or
- (C 2.1.2) additional external sensors that can sense and transmit status of the assets; and/or
- (C 2.1.3) a sensor actuator gateway that can interact with native equipment on the asset, sense and transmit their information (from C 2.0.1), and in turn can receive and propagate actuation commands back to the native equipment (to C 2.0.2).

The mobile vehicle, e.g. a push cart, an autonomous/ground-piloted drone, a plane, a yard truck, a truck, a go-cart, a car, a Segway, etc., contains installed on vehicle Equipment, comprising:

- (C 3.1.1) a computer system—to control, guide, and execute actions;
- (C 3.1.2) an indicia detector—to identify assets within local-range communication range as defined above;
- (C 3.1.3) a position tracking device—to determine its own location;
- (C 3.1.4) a sensor assembly—to detect additional asset status information. The sensor assembly may include a camera to read the sensor, e.g. a camera with an optical recognition algorithm can be used to identify an asset that has a bar-code or QR-code, or alternatively, optical recognition can be used the data on a digital sensor screen;
- (C 3.1.5) a receiver for sensor output—to obtain status information of tracked assets through it sensors;
- (C 3.1.6) an actuator controller—to instruct the tracked asset actuators to carry out commands; and
- (C 3.1.7) a communication system—to communicate with central control systems.

A central control system (FIG. 1 C 5) then receives, collates, and analyzes the information, and determines the future actions. Such future actions can be based on human or third party control systems.

In one embodiment, exemplary such actions may include:
In one embodiment, as one or more IoA refrigerated trailer fuel sensors indicates that the fuel level is low, a human operator may choose to dispatch a fuel truck; in another embodiment such action can be automated, and a fuel truck may receive automated refueling requests; in yet another embodiment, the system may calculate the anticipated residual time for the load in the trailer and base the dispatching on this information.

In one embodiment the facility may be partitioned into separate areas, where each area is the designated location of a particular type of asset. In one embodiment, as the central control determines that a particular asset is not in the right area, it can raise an alert, for a human operator to take action. In one embodiment, such action may be corrective, i.e. the human operator may request a move on the asset, in another embodiment, the human operator may seek the root cause of the displacement. Examples of such assets are luggage at an airport where it does not belong, a trailer in a facility where it should not be, books in a library on the wrong shelf.

In a typical operation, the mobile vehicle follows a trajectory (FIG. 1 C 6) across the space a facility occupies. During this travel, the on board computer (C 3.1.1) collects location information from the position tracking system (C 3.1.3), preferably at the highest possible and necessary frequency (e.g., typically ten times per second).

The need to sample at high frequency stems from the speed of the vehicle. If it is moving at 10 m/sec (22.37 miles per hour), if the sampling frequency is once a second, the assets that were in-range during that second may have been detected from anywhere on that 10 meter segment, if the sampling frequency is 10 times a second, the assets that were in range during that tenth of a second will have been detected from a one meter segment. Ultimately the frequency determines the accuracy of the in-range segment of the trajectory explained above (FIG. 7, 6.1.1), which in turn determines the locationing accuracy of the location detection algorithm since the in-range segment length determines the size of the shape (FIG. 7 E1.1 or E1.2) of the possible locations of the asset.

Conversely too high a sampling frequency creates too much congestion in the communication channel and incurs unnecessary communication cost. If in each read one is reading 100 RFID tags, with a 128 bit id, along with the GPS data (about 100 bytes per signal), and the overhead (about 50%), each transmitted information can be (100*128/8+100) *1.5 about 2.5 Kbytes per transmission. If one were to transmit ten times a second, 24 hours a day, 30 days a month one transmits about 66 Giga Bytes of data per month. While in practice one does not transmit every hour of every day, the calculation above illustrates why one should sample as much as necessary, not to incur unwarranted communication costs. Presently, a typical cellular broadband package costs approximately $50 per 10GigaBytes per month.

The same concept applies to the sensory data collected via (C 3.1.1, 3.1.4, 3.1.5). It should be appreciated that sensory data can be sampled at much lower frequency, as e.g. the temperature of a refrigeration unit does not change significantly within seconds.

The local computer (C 3.1.1) pre-processes such data (e.g. it can have the built in intelligence of what data has incremental value, or is sufficiently different across each sample) and transmits such collected location information and data from the indicia/sensor readers (using C 3.1.7 indirectly via 8.1 to C 4 via 8.2 or directly via 8.x) to central control (C 5). In one embodiment 8.1 may be implemented by WiFi, while 8.2 may be a DSL or cable service that provides wired connectivity to Internet and hence central control. In another embodiment, 8.x can leverage cellular or satellite communication that provides direct access to Internet and hence to central control. The same communication medium is used to interact with central control. As an example in one embodiment, a human operator may create a move request of a trailer from one location in the yard (as determined per the locationing algorithms) to a dock door for the trailer to be emptied. In the same example, in another embodiment, a control algorithm that has a programmed flow of trailer handling (e.g. the flow being a loaded trailer with said product needs to be emptied at dock doors 3-7; the control algorithm then using knowledge of which doors are free and determining where to move the trailer) may create the move.

The central control system in turn collates the information coming in from multiple vehicles, along with any combination of data sources such as but not limited to a) human data input, b) other sensors, and c) status prediction models. It cleanses the data leveraging the redundancies in the information; establishes a best effort ground truth conclusion; and makes such conclusion available to other human operators or other automated control systems. An example of such cleansing is as follows. As a human operator moves a trailer in a distribution center yard, it may tell the central control that it has placed the trailer at parking spot 12. Subsequently, as a yard truck passes by the area, the algorithm used to locate assets may place the trailer at parking spot 15. At this point the central control may present the information as is with both parking spots as possible locations of the trailer for users/other IT systems to determine the next steps. In another embodiment, it can use the past accuracy track record for the human operator to weigh the operator's input more or less heavily compared to the automated input. However, as multiple yard trucks pass by the same area and the locationing algorithm repeatedly places the trailer at parking spot 15, the central control may judge that the trailer is indeed at parking spot 15. Henceforth, decisions of what to do next are based on the deduced fact that the trailer is at parking spot 15. It may well be that the trailer is not supposed to be parked in that area, e.g. that area is limited to trailers of a specific carrier, and this trailer does not belong to that carrier, at which point an automatic algorithm can trigger a move request, to move and correct the location of the parked trailer. Similar examples apply to pallets that are placed at the wrong location in a warehouse, items that are misplaced in a retail store, cars that are parked at the wrong location, books placed at the wrong location at the library etc. The above example illustrates how unreliable and imprecise yet redundant data can be used to determine a ground truth reliably which then can guide future actions.

The mobile vehicle may follow a trajectory (FIG. 1 C 4) independent of its interaction with IoA equipment. The trajectory can be a random trajectory or it can be a trajectory devised for a specific purpose such as a security check round. The trajectory can be specifically devised to ensure a communication/interaction need for example such as identified by central control or such as a preset trajectory to cover a specific area. The trajectory may vary as a function of real-time information, such as but not limited to a) status information collected from IoA or b) presence/absence of other objects in the path of the trajectory, e.g. humans on the road, cranes in the flight path of a drone etc.

Examples of Facility, Asset, and Mobile Vehicle Combinations

In one or more embodiments, the innovation operates in one or more facilities with one or more mobile vehicles, and tracks one or more assets. Illustrative combinations are described as follows. Such combinations are for illustrative purposes and are not meant to be limiting.

A distribution center or manufacturing plant yard, where the mobile vehicle is a yard truck, a go-cart, or a drone and the tracked assets are trailers. As an example U.S. Pat. No. 7,321,305 can be used to identify and locate the trailers. The status of the trailers (empty/loaded, temperature, fuel level, additional location precision, etc.) is then tracked and controlled as per innovative embodiments herein.

A warehouse or manufacturing plant, where the mobile vehicle is a fork lift, a go cart, or a drone and the tracked assets are pallets, boxes, or other high value equipment in the facility. As an example U.S. Pat. No. 7,321,305 can be used to identify and locate the assets. The status of the assets (intact/damaged, temperature, fuel level, battery level, service period, additional location precision, etc.) is then tracked and controlled as per the innovative embodiments herein.

A retail store, where the mobile vehicle is a push-cart, a drone, an employee on a Segway (Segway Inc., Bedford, N.H.) and the tracked assets are the items in the retail store. In this case tracked assets may be located in 3D. As an example U.S. Pat. No. 7,321,305 can be used to identify and locate the trailers. The status of the assets (quantity, replenishment needs, expiry dates, intact/damaged, temperature, service period, additional location precision, etc.) is then tracked and controlled as per innovative embodiments herein.

A vehicle plant (either inside the plant, on or off the assembly line, or outside the plant in the parking lot) where the mobile vehicle is a car or truck (can be one of the vehicles manufactured at the plant), a forklift, a yard truck, any cargo carrying vehicle, or a drone and the tracked assets are the manufactured vehicles and other high value tools in and around the plant. As an example U.S. Pat. No. 7,321,305 can be used to identify and locate the trailers. The status of the manufactured assets (completed/in-progress, temperature, fuel level, battery level, service period, additional location precision, etc.) is then tracked and controlled as per innovative embodiments herein.

A construction site, where the mobile vehicle can be car, a forklift, a drone and the tracked assets are the construction equipment. As an example U.S. Pat. No. 7,321,305 can be used to identify and locate the assets. The status of the assets (temperature, fuel level, battery level, service period, additional location precision, etc.) is then tracked and controlled as per innovative embodiments herein.

A shipyard, where the mobile vehicle is a crane or top-pick and the tracked assets are containers. In this case tracked assets may be located in 3D. As an example U.S. Pat. No. 7,321,305 can be used to identify and locate the trailers. The status of the trailers (empty/loaded, temperature, fuel level, additional location precision, etc.) is then tracked and controlled as per innovative embodiments herein.

A farm, where the mobile vehicle is a tractor or a drone, and the tracked assets are the plants. In this case since the plants are stationary. Embodiments herein collect plant health information and actuate watering and fertilizing systems.

An airport, where the mobile vehicle is a tug used to pull the planes, a tug used to carry cargo, or any security vehicles and the tracked assets are luggage or high value equipment. As an example U.S. Pat. No. 7,321,305 can be used to identify and locate the cargo and the equipment. The status of the assets (temperature, fuel level, battery level, service period, additional location precision, etc.) is then tracked and controlled as per the innovative embodiments herein.

A large warehouse where the mobile vehicle is a forklift, a person on a Segway, or an indoor drone and the tracked assets are spare parts scattered throughout the facility. In this case tracked assets may be located in 3D. As an example U.S. Pat. No. 7,321,305 can be used to identify and locate the vehicles and tools. The status of the assets (quantity, condition, etc.) is then tracked and controlled as per innovative embodiments herein.

A farm, where the mobile vehicle is a tractor or a drone and the tracked assets are live stock or plants. As an example U.S. Pat. No. 7,321,305 can be used to identify and locate the livestock (plants are stationary). The status of the assets (health, sick, humidity, fertilizer level etc.) is then tracked and controlled as per the novel ideas of this patent.

A fish farm, where the mobile vehicle is a boat, U-boat, or drone and the tracked assets are the fish and fish food as detected by short range sensors. As the vehicle traverses a trajectory it collects status information.

Examples of Tracking, Sensing, and Actuating Applications

Application examples of the innovation are listed below. Such examples are by no means exhaustive and are for illustration purposes only.

EXAMPLE 1

Turning on Refrigerated Trailers

In a supply chain trailer yard with refrigerated trailers, an external IT system (C 11) selects a number of refrigerated trailers to carry outbound loads. Furthermore it provides the planned departure times of these loads and determines that the loads should be ready about an hour before departure.

This information instructs the central control (C 5) to turn on the refrigeration units on these trailers to lower their temperature as determined by the load they have to carry. Assuming the loading action takes two hours, and assuming the cooling of the trailer takes two hours, and in this facility typically every part of the yard is traversed by a mobile vehicle (C 3 in this case a yard truck or a Segway that personnel, such as security, drives around on a regular basis, or a drone that has a regular flight plan to check location and status of assets) at least once an hour, transmitting the turn-on command for a trailer seven hours before the departure time would correspond to the optimal time of transmitting the turn on command. Central command can transmit this command to the mobile vehicles (C 3) in the facility either via (C 8.2) to (C 4) to (C 8.1) or directly via (8.x) to (C 3) if they are using a direct broad range communication scheme.

The mobile vehicles (C 3) then as part of their operation, as they traverse trajectories (C 6) as they come to within the vicinity of an asset (in this case a refrigerated trailer) with their actuator interface (C 3.1.6) can local-range communicate with an asset sensor actuator gateway (C 2.1.3) on the asset that interfaces with the actuator interface of the refrigerated trailer (C 2.0.2) to turn on the refrigerated trailer on just in time.

In one or more embodiment, in absence of the ability to turn refrigeration units on with the herein described scheme of mobile vehicles (C 3) one either has to plaster the facility with enough devices like (C 2.1.3) that have their own network communication like (C 3.1.7) and their own power source such that any trailer has the ability to be accessed by central control at all times; or to send a person to the trailer to turn on the unit.

The former represents significant installation or maintenance cost. The latter typically results in such action taking place typically once or twice a day for the trailers that will be loaded that day. Such action represents manual labor costs, is prone to error, and is not energy efficient.

To have the assets ready "in-time" typically means that a person walks the entire yard and turns on the trailers that are needed in a given day.

The benefit of such approach in one or more embodiments is multi fold. Energy savings result from just in time activation of the refrigerated trailers, labor is saved by eliminating manual labor that would have to travel to the trailer to activate the refrigeration unit without incurring significant installation and maintenance costs.

EXAMPLE 2

Refrigeration Fuel Check

Similar to Example 1, the temperature and fuel level of the reefer trailers can be checked to ensure proper conditioning.

Following the example above while there is a planned departure time for each trailer not every carrier may show up on time for pick-up. Conversely not every arriving refrigerated trailer may be emptied immediately upon arrival.

In one embodiment for departing trailers, central control (C 5) may receive from the transportation management system (C 11) planned departure times and planned travel times.

As mobile vehicles (C 3) traverse the facility along their trajectories (C 6) and use their interface (C 7) and let their sensor interface (C 3.1.5) interrogate the refrigeration unit interface (C 2.1.3) they accomplish two tasks:

They determine which trailers are still in the yard (both asset indicia (C 2.1.1) and the information rom (C 2.1.3) identify the trailer; and They determine the fuel levels and temperatures.

As this information is transmitted by the mobile vehicle (C 3) leveraging its communication device directly (C 8.X) or indirectly (C 8.1 to C 4 to C 8.2) to central control, central control is in a position to react to such information, as follows.

A list of trailers that are late to departure may be presented to human operators on a console (C 12);

Human operators may call the delayed carriers;

A message can be sent to carriers that are late for pick up;

Based on planned travel time for the delivery a computation can be performed by central computer (C 5) and determine if the remaining fuel is sufficient for the trip;

For trailers that no longer have sufficient refrigeration fuel, instructions can be created for on-site personnel to refuel the refrigeration unit. On site personnel that can retrieve instructions on a console (c 12); and Finally despite proper fuel levels, the temperature of a trailer may not meet the designated setting, in this case instructions are created to unload the shipment and reload it to another trailer, as the refrigeration unit of this trailer is faulty.

The benefit of such approach in one or more embodiments is multi fold. Cargo shrink is prevented by maintaining proper temperature levels; labor is saved by eliminating manual labor that would have to travel to the trailer to check the refrigeration unit status. Shipment delays are minimized.

EXAMPLE 3

Refrigeration Fuel Check—Alteration of Mobile Vehicle Trajectory

Similar to Example 2, the mobile vehicle, e.g. mobile vehicle (C 3), as part of its otherwise operations checks refrigerated trailer fuel levels using its IoV equipment (C 3.1). It can then transmit this information as described above indirectly (C 8.1 to C 4 to C 8.2) or directly (C 8.x) to central control (C 5). Central control may include a model of refrigeration units which predicts refrigeration fuel consumption. A comparison of predicted fuel levels versus actual fuel levels may reveal that fuel consumption has exceeded the predictions. Either because of model limitations or special weather conditions of the day, clearly fuel consumption can exceed the prediction. A business rule can then send instructions to the mobile vehicles to traverse set trajectories that ensure "local-range" vicinity to the IoA equipment in the entire facility. Autonomous vehicles receive and execute such commands with their on board computer (C 3.1.1) whereas human operators leverage (C 12) a console (C 11) to retrieve and execute the request to immediately gather to the fuel level and temperature information.

The benefit of this approach in one or more embodiments is multi fold. Cargo shrink is prevented by maintaining proper temperature levels; labor is saved by eliminating manual labor that would have to travel to the trailer to check the refrigeration unit status. This is achieved without any major communication infrastructure.

EXAMPLE 4

Inventory Check Inside a Warehouse or Retail Store

Same concepts apply inside a building. Since GPS may not be as readily available a number of other techniques can be used by the position tracking device on the mobile vehicle, such as optical guidance, fixed asset markers around the building, sensor network on the ceiling, etc.

In the warehouse a number of fork-lifts may be equipped with the IoV equipment and perform cycle counts on the assets (pallets, boxes, unstructured assets) on the shelves while also tracking the other equipment in the warehouse. In a retail store the IoV can be placed on a push cart operated by customers or one of the employees and perform cycle counts on the assets (pallets, boxes, unstructured assets) on the shelves while also tracking the other equipment in the store.

In these examples the presence and location of the assets are determined by focusing on the in-range segments (C 6.1 from FIG. 6) and applying the algorithms described above in the context of FIGS. 6 and 7.

In this case location tracking is performed in 3D.

The presence or location information then allow central control (C 5) to take corrective action and send instructions to move misplaced assets to correct locations.

One or more embodiments obviate the need of intensive labor to perform these cycle counts or the need to have facility-range communication coverage to perform inventory checks.

EXAMPLE 5

Finished Vehicle Inventory Check

In a vehicle manufacturing plant vehicles that come off an assembly line are parked in and around the factory. Some of these vehicles are ready to be shipped; others need to be brought back in for rework. The vehicles are parked close to each other by drivers. In this application a dedicated aerial drone or a human driven small mobile vehicle such as a Segway is more appropriate as the mobile vehicle, while RFID tags on the windshield or bumper of the vehicle are more suitable for identification. As an example ideas in U.S. Pat. No. 7,321,305 can be used to perform regular inventory checks to locate assets and to make sure they are reworked and shipped on time. A drone can follow set flight plans to locate vehicles at regular parking locations.

If the inventory check results in a discrepancy and a number of vehicles are not located, the computer system on the mobile vehicle (C 3.1.1) can choose to engage extended flight paths, to cover overflow and irregular parking spots.

In this example the instructions to the IoV (C 3) by central control (c 5) are, in addition to perform an inventory, to compare the inventory against a pre-specified list and take corrective action if there are missing assets.

One aspect of embodiments described herein is, again, the ability to perform inventory checks and to locate assets without a facility or broad range communication mechanism on the assets. The benefit of this is multi fold. A mis-parked vehicle may not be reworked in time. A vehicle shipped a day early is converted to cash a day early. Plus the result is achieved with less labor cost.

EXAMPLE 6

Construction Yard Equipment Tracking and Maintenance

In a distribution center or a manufacturing plant assets are primarily trailers; and assets are primarily moved by yard trucks or tractors. In a construction yard high value assets can be carried and moved by any individual. Furthermore some of these assets may require regular maintenance. Typically such movement and maintenance has to follow set protocol of checking in and checking out of assets. Yet humans are not reliable.

An autonomous vehicle such as a ground robot car or an aerial drone (C 3) can follow set travel or flight paths (C 6) to cover the construction area (C 1). The vehicle as sensor interface (C 3.1.5) can use near field communication (NFC) to interrogate NFC compliant assets (i.e. IoA C 2.01.1 is NFC compliant) and equipment for necessary maintenance. For example some heavy machinery may require an oil change after a certain number of operational hours. The vehicle can also compare actual asset location to presumed asset location based on manual check-in/check-out operation. In another embodiment such check-in/check-out can be implemented and monitored by additional sensors, such as stationary RFID readers that implement a choke-point for entry and exit. User input (C 12) may suggest that particular power drill is in one part of the facility, while the approach described herein may place it elsewhere. This may result in an alert to a supervisor.

Determination of maintenance needs can be an escalated event that halts construction. For example the misplaced asset may be combustive material such as dynamite. Determination of misplaced assets may trigger an extended inventory check.

In one embodiment the drive/flight trajectory of the mobile vehicle may have to accommodate crane movement in the construction area and sequence its trajectory components to avoid high traffic areas. In different embodiments such adjustment may be made by Central control (C 5) which prescribes the trajectories; and The autonomous vehicle (C 3) on board computer (C 3.1.1) leveraging onboard sensors (C 3.1.4).

Examples of Central Control Capabilities

EXAMPLE 7

Multiple Vehicles and Fault Tolerance

Some sensors used on the assets and vehicles may have limits on their accuracy. The indicia/asset-id readers may not always perform flawlessly. The weather conditions may further impact communication and sensor performance.

In an environment where multiple mobile vehicles are in operation, the data they gather may be redundant or may not be always in agreement. In such cases the central control can analyze such data across multiple sources and determine ground truth from a superset of data.

In an embodiment, not all assets may be seen every time by every vehicle, but all assets are bound to be seen sometime by some vehicle.

In the context of FIG. 6, a given asset (C 2) may have limited local-range communication (C 2.1.$x$) depicted as a triangle. In the context of FIG. 7, as the mobile vehicle (C 3) passes by on a trajectory (C 6.1) with a theoretical in-range segment of (C 6.1.1) may fail to communicate or detect the indicium on the Asset or interact with the sensors due to noise, occlusion, or imprecision in the system. However, the same negative conditions are unlikely to hold every subsequent trajectory's in-range segment (c 6.2.1 etc.) unless there is a total failure on the IoA equipment.

EXAMPLE 8

Specific Trajectories

As information arrives from the mobile vehicles, the central control can determine that no information has been obtained from part of the facility, i.e. the trajectories (C 6) have not covered parts of the facility (C 1) in sizes that far exceed the local-range communication of IoA equipment (C 2.1.x as depicted in FIG. 6). Central control (C 5) can then require a vehicle to follow a set trajectory in that area initially for an inventory and status check. A request can be sent to a human driver or an autonomous vehicle leveraging communication mechanisms indirectly (C 8.2 C 4 C 8.1) or directly (C 8.x) for the vehicle (C 3) to traverse a said trajectory (C 6) in that area.

Data collected from this and other trajectories (C 6) can be communicated to other IT systems (C 9). For example a trailer that has not left the facility as planned can become a delay notification to the transportation management system. Alternatively they can be alerts for human operators (C 12) for them to call the carrier.

EXAMPLE 9

IoA Equipment Failure Detection

If there are multiple indicia (C 2.1.1) or asset sensor/actuator gateways (C 2.1.3) on an asset, if after multiple traversals of an in-range segments (6.x) of vehicles (C 3) no detection or communication is achieved with one of the indicia or sensor gateways, central control (C 5) can deduce a failure and dispatch a human operator through the human operator interface (C 12).

If no detection or communication is achieved with an asset after having traversed the parts of the facility, the central control has to conclude that the asset is either no longer in the facility or its IoA has failed. If asset entry and exit to the facility is strictly controlled, this suggests an IoA failure. However, if a human operator subsequently cannot locate the asset in the facility, this suggests a failed check-out.

Exemplary Embodiments

In an embodiment, a method for determining and controlling a status of an asset in a facility using a mobile vehicle, comprises: reading, by an object identification device on said mobile vehicle, indicia of an asset in range; determining, by a position-tracking device on said mobile vehicle, a location of said mobile vehicle; sensing, by at least one sensor on said mobile vehicle, status of the asset; receiving, by at least one receiver on said mobile vehicle, a communication from at least one sensor on said asset; transmitting, by at least one transmitter on said mobile vehicle, a communication to at least one actuator on said asset; communicating, by a communication mechanism on said mobile vehicle, with a central control server; recording, by a computer system on said mobile vehicle, any of: said location of the mobile vehicle obtained from said position-tracking device; indicia of said asset, read by said object identification device; and said status of said asset obtained from said at least one mobile vehicle sensor; transmitting, by said computer system on said mobile vehicle, said recorded information to said central control server; receiving from said central control server, by said computer system on said mobile vehicle, control instructions for said asset and control instructions for said mobile vehicle; and transmitting, by said computer system on said mobile vehicle, said control instructions to said at least one actuator on said asset.

In an embodiment, in the method, the mobile vehicle is any of a car, a push cart, a person, a plane, a drone, and a Segway; wherein the mobile vehicle is propelled by a force comprising any of: an engine, a human, or an animal; and the mobile vehicle is guided by any of: autonomously, local humans, remote humans, and animals.

In an embodiment, in the method, the at least one mobile vehicle sensor uses a plurality of technologies to gather state information, said technology comprising: RFID; ultrasound; infrared; radar; laser; accelerometers, gyroscopes, and inertial measurement units, barometers, temperature sensors, speed and altitude detectors, and camera.

In an embodiment, in the method, the at least one transmitter and said at least one receiver communicate in a plurality of technologies with said at least one asset sensor to gather state information or to transmit actuation control, said technologies comprising: RF; NFC communication protocols; IOT communication protocols; Bluetooth; Zigbee; 802.11x; and UWB.

In an embodiment, in the method, the sensed information comprise any of: location; age; fuel level; temperature; humidity; weight; size (width, depth, height); service codes; and error codes.

In an embodiment, in the method, the control instructions to said at least one actuator on said asset comprise any of or any combination of: turn on; turn off; adjust temperature setting; adjust communication protocol; adjust communication frequency; and clear error codes.

In an embodiment, in the method, a trajectory of said mobile vehicle is determined and altered in real-time due to any of or any combination of: information collected by said mobile vehicle; facility layout; recent arrival or departures or other asset movement; past age of assets in the facility; weather conditions; facility activity level; central control; and other objects entering a planned trajectory timeline.

In an embodiment, in the method, the position tracking device on said mobile vehicle uses one or more of the following to determine its location, speed, and heading: GPS; known asset locations in the facility, implemented by markers, from which the device triangulates its location; assisted GPS; an optical system or a PX4Flow; an altimeter or a Lidar or similar device; Inertial Measurement Units; J-Bus or CAN-bus interface of the vehicle; and ultrasonic sensors.

In an embodiment, in the method, the mobile vehicle communicates with said central control server over any of: cellular infrastructure; cellular infrastructure comprising any of: 3G, 4G, 5G, 1×RTT, GPS, GSM, or CDMA; Y-max; 802.11x; mesh networks; Zigbee; and any communication technology.

In an embodiment, in the method, the object identification device uses any of or any combination of the following to detect and identify said asset and said indicia on said asset: C1G2, G3, UWB, active, passive, semi-active, semi-passive RFID; bar codes; QR codes; actual image and image recognition; and image insignia and insignia recognition.

In an embodiment, a method for determining and controlling a status of an asset in a facility, comprises: sensing, by at least one sensor on said asset in the facility, a status of said asset; transmitting, by said at least one sensor on said asset, said status to a mobile device in range; interacting, via at least one sensor actuator gateway on said asset, with said at least one sensor on said asset, at least one actuator on said asset, and an external system; and receiving, at said at least one actuator on said asset, at least one control command from said mobile device in range.

In an embodiment, in the method, the at least one sensor on said asset uses a plurality of technologies to sense asset status, said technologies comprising: RFID; ultrasound; infrared; radar; laser; accelerometers, gyroscopes, and inertial measurement units; barometers, temperature sensors, speed and altitude detectors; and built in diagnostics and actuation systems.

In an embodiment, in the method, the sensed information comprise any of: location; age; fuel level; temperature; humidity; weight; size (width, depth, height); service codes; and error codes.

In an embodiment, in the method, the at least one control command comprises any of: turn on; turn off; adjust temperature setting; adjust communication protocol; adjust communication frequency; and clear error codes.

In an embodiment, a method for determining and controlling a status of an asset in a facility using a central control server, comprises: receiving, at said central control server, communication from a plurality of mobile vehicles; collating and aggregating, at said central control server, information from said received communication across a predetermined time interval and a predetermined geographical range of space; based on said collated and aggregated information, determining by the central control server, the status of the asset and computing by an algorithm at said central control server used to locate positions of assets the location of the asset in the facility; based on said collated and aggregated information, generating, at said central control server, at least one actuator action for said asset; and transmitting, by said central control server, said at least one actuator action intended for said asset.

In an embodiment, in the method, the at least one actuator action comprises any of: turn on; turn off; adjust temperature setting; adjust communication protocol; adjust communication frequency; and clear error codes.

In an embodiment, in the method, the central control server further comprises: gathering and subsequently collating information gathered by additional stationary sensors; collating and aggregating information about mobile vehicle location, speed, and heading of a particular mobile vehicle of said plurality of mobile vehicles and generating a list of assets that are in range at said location; reverse engineering said information to determine where in a 3D coordinate point in the facility and when an asset having equipment is in range; and based on said information computing a most likely location of said asset at a given time; resolving inconsistent data in said collated information by identifying, weighing, and applying particular redundancies in the collated information to increase overall accuracy of said information; comparing said collated information with data entered by human operators or predicted by system models, and determining a reliability of data from each data source; comparing data between user generated asset movement information and said computed most likely asset location information and using similar data to increase location accuracy of said asset; when particular data from said data from each data source is determined to be unreliable, replacing said unreliable data with said data determined reliable; presenting current status information to human operators or other automated control modules; receiving input from said other automated control models and said human operators; and transmitting control instructions to said plurality of mobile vehicles, said instructions comprising: actions on the asset actuators; and actions on the mobile vehicle trajectory.

In an embodiment, in the method, the central control server communicates with said mobile vehicle over any of: cellular infrastructure; cellular infrastructure comprising any of: 3G, 4G, 5G, 1×RTT, GPS, GSM, or CDMA; Y-max; 802.11x; mesh networks; Zigbee; and any communication technology.

In an embodiment, in the method, generating said at least one actuator action further comprises using data from any of or any combination of a human source, a third party control system, and a business rule.

An Example Machine Overview

Figure 8:
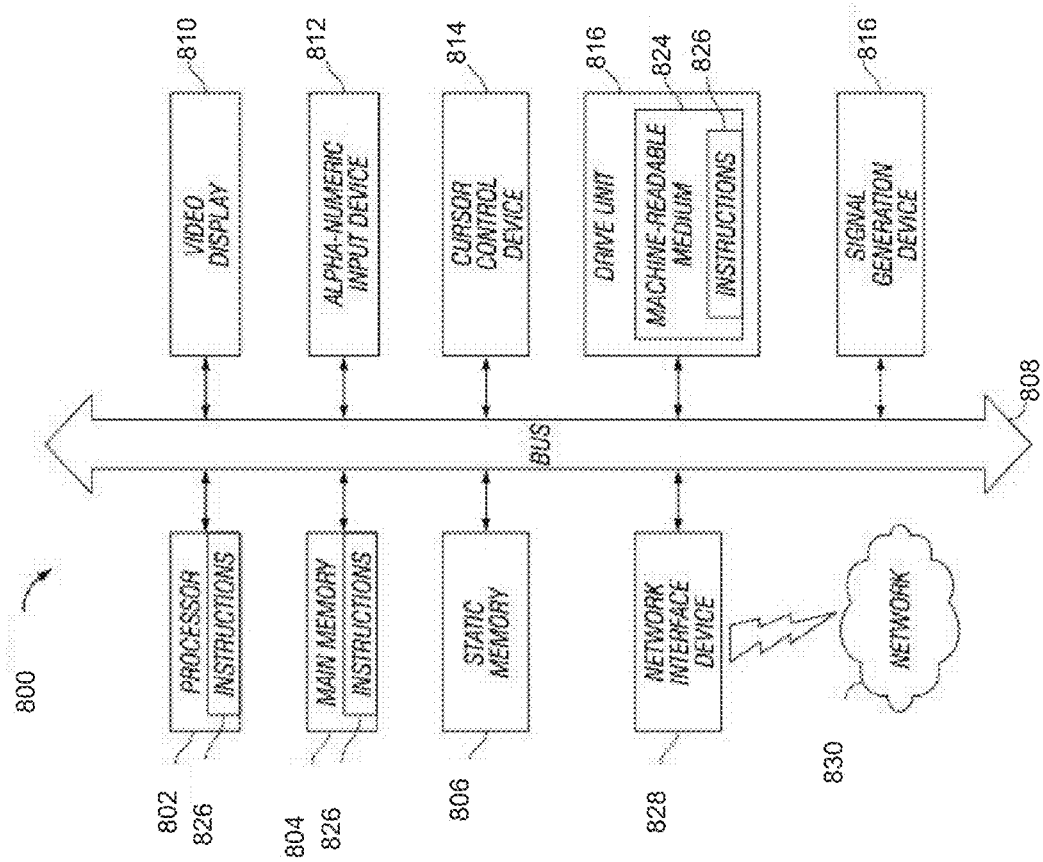
FIG. 8 is a block schematic diagram of a system in the exemplary form of a computer system according to an embodiment.

FIG. 8 is a block schematic diagram of a system in the exemplary form of a computer system 800 within which a set of instructions for causing the system to perform any one of the foregoing methodologies may be executed. In alternative embodiments, the system may comprise a network router, a network switch, a network bridge, personal digital assistant (PDA), a cellular telephone, a Web appliance or any system capable of executing a sequence of instructions that specify actions to be taken by that system.

The computer system 800 includes a processor 802, a main memory 804 and a static memory 806, which communicate with each other via a bus 808. The computer system 800 may further include a display unit 810, for example, a liquid crystal display (LCD) or a cathode ray tube (CRT). The computer system 800 also includes an alphanumeric input device 812, for example, a keyboard; a cursor control device 814, for example, a mouse; a disk drive unit 816, a signal generation device 818, for example, a speaker, and a network interface device 828.

The disk drive unit 816 includes a machine-readable medium 824 on which is stored a set of executable instructions, i.e. software, 826 embodying any one, or all, of the methodologies described herein below. The software 826 is also shown to reside, completely or at least partially, within the main memory 804 and/or within the processor 802. The software 826 may further be transmitted or received over a network 830 by means of a network interface device 828.

In contrast to the system 800 discussed above, a different embodiment uses logic circuitry instead of computer-executed instructions to implement processing entities. Depending upon the particular requirements of the application in the areas of speed, expense, tooling costs, and the like, this logic may be implemented by constructing an application-specific integrated circuit (ASIC) having thousands of tiny integrated transistors. Such an ASIC may be implemented with CMOS (complementary metal oxide semiconductor), TTL (transistor-transistor logic), VLSI (very large systems integration), or another suitable construction. Other alternatives include a digital signal processing chip (DSP), discrete circuitry (such as resistors, capacitors, diodes, inductors, and transistors), field programmable gate array (FPGA), programmable logic array (PLA), programmable logic device (PLD), and the like.

It is to be understood that embodiments may be used as or to support software programs or software modules executed upon some form of processing core (such as the CPU of a computer) or otherwise implemented or realized upon or within a system or computer readable medium. A machine-readable medium includes any mechanism for storing or transmitting information in a form readable by a machine, e.g. a computer. For example, a machine readable medium includes read-only memory (ROM); random access memory (RAM); magnetic disk storage media; optical storage media; flash memory devices; electrical, optical, acoustical or other form of propagated signals, for example, carrier waves, infrared signals, digital signals, etc.; or any other type of media suitable for storing or transmitting information.

Further, it is to be understood that embodiments may include performing operations and using storage with cloud computing. For the purposes of discussion herein, cloud computing may mean executing algorithms on any network that is accessible by Internet-enabled or network-enabled devices, servers, or clients and that do not require complex hardware configurations, e.g. requiring cables and complex software configurations, e.g. requiring a consultant to install. For example, embodiments may provide one or more cloud computing solutions that enable users, e.g. users on the go, to track and control the respective locations and statuses of an object, said tracking and controlling on such Internet-enabled or other network-enabled devices, servers, or clients. It further should be appreciated that one or more cloud computing embodiments include track and control the respective locations and statuses of an object using mobile devices, tablets, and the like, as such devices are becoming standard consumer devices.

Although the invention is described herein with reference to the preferred embodiment, one skilled in the art will readily appreciate that other applications may be substituted for those set forth herein without departing from the spirit and scope of the present invention. Accordingly, the invention should only be limited by the Claims included below.

The invention claimed is:

1. A method for determining a status of an asset using a mobile vehicle, comprising:
   reading, by one or more sensors on said mobile vehicle, indicia of an asset in range;
   determining, by a position-tracking device on said mobile vehicle, a location of said mobile vehicle;
   sensing, by at least one of said one or more sensors on said mobile vehicle, status information about the asset;
   recording, by a computer system on said mobile vehicle, any of:
      said location of the mobile vehicle;
      at least a portion of said indicia of said asset; and
      said status information about said asset;
   transmitting, by said computer system on said mobile vehicle, said recorded information to a central control server located remotely from said mobile vehicle;
   receiving from said central control server control instructions for said asset and said mobile vehicle;
   providing a display mounted to the asset, the display showing a thermometer or comprising a digital display;
   wherein one of said one or more sensors comprises a camera; and
   using said camera to read information displayed on the display.

2. The method of claim 1, wherein the mobile vehicle is any of a car, a push cart, a person, a plane, a drone, and a Segway; wherein the mobile vehicle is propelled by a force comprising any of: an engine, a human, or an animal; and wherein the mobile vehicle is guided by any of: autonomously, local humans, remote humans, and animals.

3. The method of claim 1, wherein said one or more sensors gathers status information using one or more technologies selected from the group consisting of:
   RFID;
   ultrasound;
   infrared;
   radar;
   laser;
   accelerometers, gyroscopes, and inertial measurement units;
   barometers;
   temperature sensors;
   speed and altitude detectors; and
   camera.

4. The method of claim 3, further comprising combining said camera on said mobile vehicle with one or more image recognition algorithms executing in memory in any of or any combination of: said camera, said mobile vehicle, or said central control server, to infer status of said asset.

5. The method of claim 1, wherein said computer system on said mobile vehicle and said central control server communicate using one or more technologies selected from the group consisting of:
   RF;
   NFC communication protocols;
   IOT communication protocols;
   Bluetooth;
   Zigbee;
   802.11x; and
   UWB.

6. The method of claim 1, wherein said sensed status information comprise any of:
   location;
   age;
   fuel level;
   temperature;
   humidity;
   weight;
   size (width, depth, height);
   service codes; and
   error codes.

7. The method of claim 1, wherein said control instructions comprise any of or any combination of:
   turn on;
   turn off;
   adjust temperature setting;
   adjust communication protocol;
   adjust communication frequency; and
   clear error codes.

8. The method of claim 1, wherein a trajectory of said mobile vehicle is determined and altered in real-time due to any of or any combination of:
   information collected by said mobile vehicle;
   facility layout;
   recent arrival or departures or other asset movement;
   past age of assets in the facility;
   weather conditions;
   facility activity level;
   central control; and
   other objects entering a planned trajectory timeline.

9. The method of claim 1, wherein said position tracking device on said mobile vehicle uses one or more of the following to determine the location, speed, and heading of the mobile vehicle:

GPS;
known asset locations in the facility, implemented by markers, from which the device triangulates its location;
assisted GPS;
an optical system or a PX4Flow;
an altimeter or a Lidar or similar device;
Inertial Measurement Units;
J-Bus or CAN-bus interface of the vehicle; and
ultrasonic sensors.

10. The method of claim 1, wherein said computer system of said mobile vehicle communicates with said central control server over any of:
cellular infrastructure;
cellular infrastructure comprising any of: 3G, 4G, 5G, 1xRTT, GPS, GSM, or CDMA;
Y-max;
802.11x;
mesh networks;
Zigbee; and
any communication technology.

11. The method of claim 1, wherein said one or more sensors use any of or any combination of the following to detect and identify said asset and said indicia on said asset:
C1G2, G3, UWB, active, passive, semi-active, semi-passive RFID;
bar codes;
QR codes;
actual image and image recognition; and
image insignia and insignia recognition.

12. The method of claim 1, further comprising:
collating and aggregating, at said central control server, information from said received communication from the computer system of the mobile vehicle across a predetermined time interval and a predetermined geographical range of space;
based on said collated and aggregated information, determining by the central control server, the status of the asset and computing by an algorithm at said central control server used to locate positions of assets the location of the asset in a facility;
based on said collated and aggregated information, generating, at said central control server, at least one action for said mobile vehicle relating to said asset; and
transmitting, by said central control server, said at least one action to said computer system of the mobile vehicle.

13. The method of claim 12, wherein generating said at least one action further comprises using data from any of or any combination of a human source, a third party control system, and a business rule.

* * * * *